A. L. CARROLL.
CAR WHEEL.
APPLICATION FILED DEC. 31, 1919.
1,336,128. Patented Apr. 6, 1920.
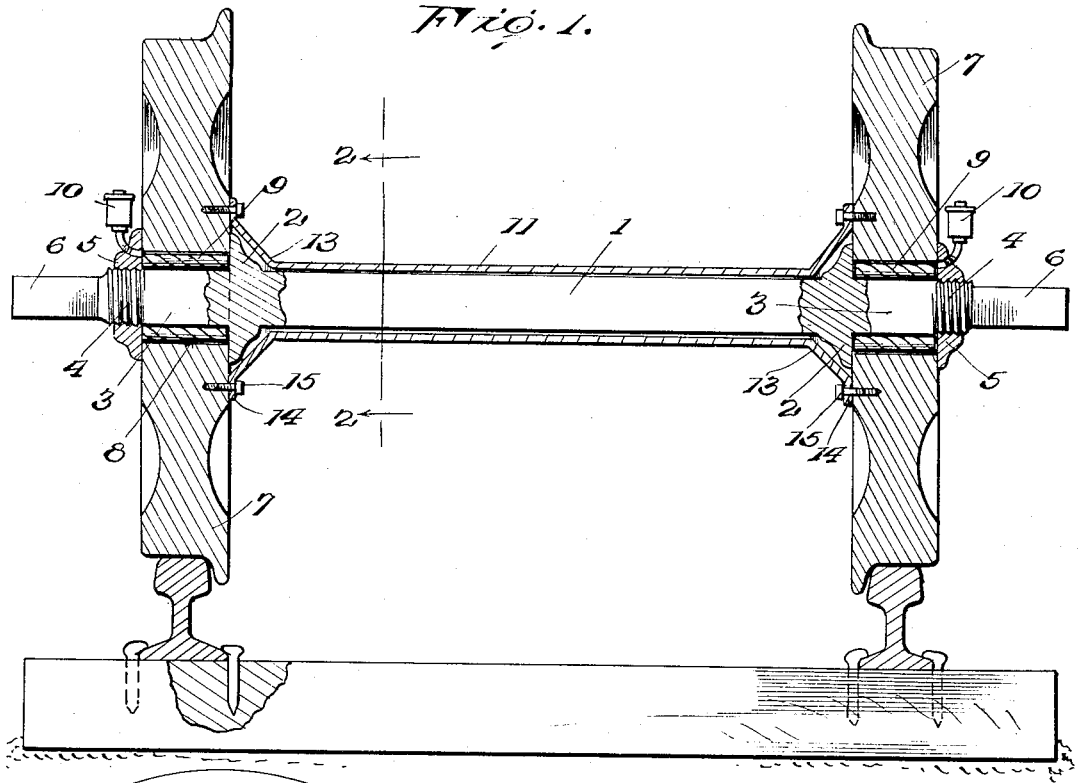
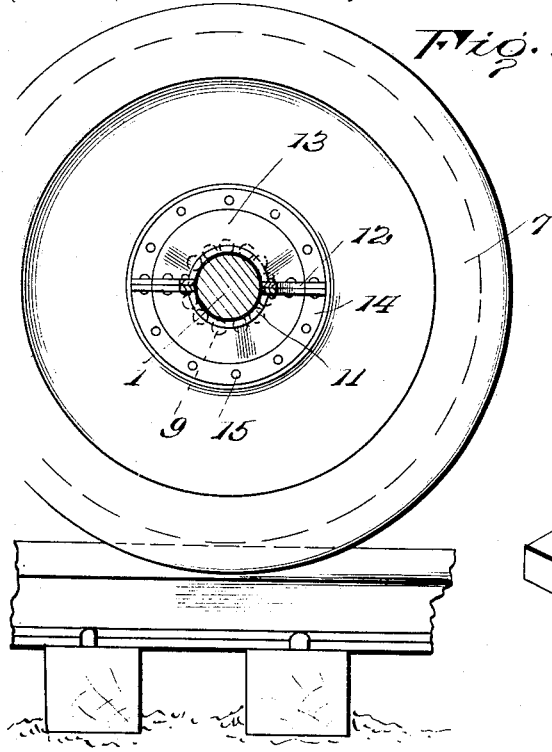
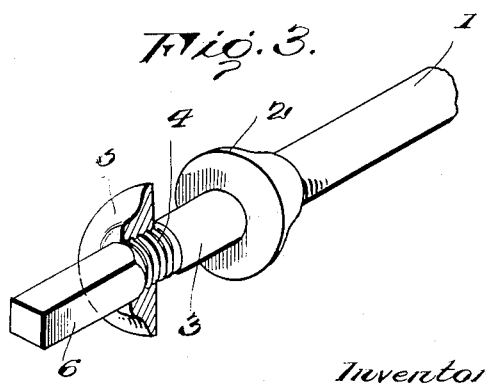
Inventor:
Andrew L. Carroll.
by Lacey & Lacey,
his Atty's.

UNITED STATES PATENT OFFICE.

ANDREW L. CARROLL, OF ST. LOUIS, MISSOURI, ASSIGNOR OF ONE-SIXTH TO OLIVER ROWLETT, ONE-SIXTH TO JORDAN W. CHAMBERS, AND ONE-SIXTH TO J. W. BRONAUGH, ALL OF ST. LOUIS, MISSOURI.

CAR-WHEEL.

1,336,128.   Specification of Letters Patent.   Patented Apr. 6, 1920.

Application filed December 31, 1919. Serial No. 348,549.

*To all whom it may concern:*

Be it known that I, ANDREW L. CARROLL, a citizen of the United States, residing in the city of St. Louis and State of Missouri, have invented certain new and useful Improvements in Car-Wheels, of which the following is a specification.

This invention relates to car wheels and has for its object the provision of a simple and inexpensive construction by the use of which the rolling qualities of the wheel will be enhanced and heating of the same, due to frictional resistance to its rotation, will be minimized. The invention also seeks to provide a wheel which may be very easily fitted to an axle and retained in proper position thereon.

The invention is illustrated in the accompanying drawings, in which—

Figure 1 is a longitudinal section of an axle having my improved car wheel mounted thereon;

Fig. 2 is a transverse section on the line 2—2 of Fig. 1;

Fig. 3 is a detail perspective view of a portion of the axle.

In carrying out my present invention: I employ an axle 1 which may be of the usual material and which may be of any desired cross sectional form in its intermediate portion. At proper points upon the axle, near the ends thereof, I provide annular flanges 2 which may be cast integral with the axle or may be shrunk thereon or otherwise intimately and rigidly affixed thereto. At the outer side of each flange 2, the axle is constructed with a portion 3 of circular cross sectional form and equal in length to the width of the wheel which is to be mounted upon the axle. Outwardly beyond this circular portion of the axle is a threaded portion 4 which receives an outer annular flange 5 and beyond the said threaded portion is a reduced angular extremity 6 which is to be engaged in the usual box or other fitting whereby the axle is secured upon the truck and wedged or otherwise rigidly secured in said fitting. Before the outer flange 5 is fitted upon the axle, the wheel 7 is engaged over the circular portion 3 thereof and the central circular opening or bore of the wheel is of greater diameter than the axle, as indicated at 8, whereby a circular chamber or space is provided to receive anti-friction rollers 9. After the wheel and the rollers have been properly placed in position, the outer flange 5 is turned home so as to retain the rollers in place and prevent loss of lubricant, and to supply lubricant to the rollers an oil cup 10 may be secured upon the flange 5 and have its discharge extend through said flange as shown although lubricant may be fed through any other preferred means. The casing 11 is a substantially cylindrical sleeve fitted around the axle and consisting of two similar members having bearing flanges 12 along their opposed edges through which fastening bolts or rivets may be inserted whereby to secure the casing around the axle between the two car wheels. The ends of this casing are flared, as shown at 13, whereby to fit around the fixed flange 2 and the extremities 14 of the flared portions are turned radially outward so as to fit flat against the inner face of the adjacent wheel and be secured thereto by cap bolts or screws 15 inserted through said portions 14 into the body of the wheel, as clearly shown in Fig. 1.

It will be readily understood from the foregoing description, taken in connection with the accompanying drawings, that I have provided an exceedingly simple and inexpensive wheel which may be readily fitted upon its axle and which may rotate freely. The axle will be firmly held against rotation but the provision of the anti-friction rollers will practically eliminate resistance to the rotation of the wheel about the axle and over-heating, which is now a frequent occurrence with car wheels, will be overcome. The inner flanges upon the axle serve to maintain the wheels in proper spaced relation while the casing around the axle effectually guards the same against an accumulation of dust and dirt. The outer flange may be turned home against the wheel and the ends of the rollers so as to prevent loss of lubricant and resistance to the rotation of the wheel exerted by the flange will be nullified by the access of some lubricant to the inner face of the same. While the invention is intended more particularly for use in connection with car-wheels, it may, of course, be applied to the wheels of automobiles or other vehicles,

Having thus described the invention, what is claimed as new is:

1. The combination of an axle having circular portions near its ends and angular extremities, of wheels fitted around the circular portions of the axle, rollers disposed around the axle and within the bore of the wheels, fixed flanges on the axle bearing against the inner faces of the wheels, and removable flanges mounted on the axle and bearing against the outer sides of the wheels.

2. The combination of an axle having circular portions near its ends and having fixed annular flanges at the inner ends of said circular portions, the extremities of the axle being angular, wheels fitted about the circular portions of the axle and against the said fixed flanges, rollers disposed about the circular portions of the axle and within the wheels, removable flanges fitted upon the axle and bearing against the outer sides of the wheels, and a casing inclosing the axle between the wheels and fitting around said fixed flanges and secured to the inner faces of the wheels.

In testimony whereof I affix my signature.

ANDREW L. CARROLL. [L. S.]